United States Patent

[11] 3,604,950

[72] Inventors Melvin T. Anderson
Forest;
James E. Luth, Lynchburg, both of, Va.

[21] Appl. No. 822,444
[22] Filed May 7, 1969
[45] Patented Sept. 14, 1971
[73] Assignee General Electric Company

[54] SWITCHING CIRCUIT
2 Claims, 2 Drawing Figs.

[52] U.S. Cl. .......... 307/243, 307/254, 307/308
[51] Int. Cl. .......... H03k 17/00
[50] Field of Search .......... 307/243, 308, 254

[56] References Cited

UNITED STATES PATENTS

| | | | |
|---|---|---|---|
| 3,007,056 | 10/1961 | Logue et al. | 307/243 |
| 3,023,321 | 2/1962 | Isabeau | 307/308 |
| 3,051,854 | 8/1962 | Weber | 307/243 |
| 3,098,214 | 7/1963 | Windes et al. | 307/243 |
| 3,136,859 | 6/1964 | Leakey | 307/243 |
| 3,235,840 | 2/1966 | Sturm | 307/243 |

*Primary Examiner*—Donald D. Forrer
*Assistant Examiner*—Harold A. Dixon
*Attorneys*—James J. Williams, Frank L. Neuhauser and Oscar B. Waddell

ABSTRACT: One of two input circuits is selectively connected to an output circuit through first and second PNP-type transistors. Normally, the first transistor is turned off and the second transistor is turned on to disconnect the first input circuit from the output circuit, and to connect the second input circuit to the output circuit. The first transistor can be turned on and the second transistor can be turned off by a switching signal to connect the first input circuit to the output circuit, and to disconnect the second input circuit from the output circuit.

INVENTORS:
MELVIN T. ANDERSON,
JAMES E. LUTH,
BY James J. Williams
THEIR ATTORNEY.

SWITCHING CIRCUIT

BACKGROUND OF THE INVENTION

Our invention relates to a switching circuit, and particularly to an improved switching circuit that utilizes transistors for selectively connecting one of two input circuits to an output circuit.

Many electronic and radio devices require that one of two input circuits be selectively connected to an output circuit. For example, a radio transmitter may be normally operated by a microphone at the transmitter. Under some conditions, it may be desirable to operate the transmitter remotely, such as by a telephone line between the transmitter and a remote location. Various devices, such as relay circuits or separate amplifiers, have been utilized in such applications. However, such devices have not been as reliable as desired, or have been relatively expensive, or have not performed the needed function.

Accordingly, an object of our invention is to provide a new and improved switching circuit.

Another object of our invention is to provide an improved switching circuit that selectively connects one of two input circuits to an output circuit in response to a switching signal.

Another object of our invention is to provide an improved switching circuit that normally connects one input circuit to an output circuit, and that disconnects the one input circuit from the output circuit and connects another input circuit to the output circuit in response to a control signal.

Another object of our invention is to provide an improved switching circuit that selectively connects a source circuit to one of two load circuits.

Another object of our invention is to provide an improved switching circuit that can be operated for connecting an output circuit, leading to a radio transmitter for example, to one of two input circuits.

SUMMARY OF THE INVENTION

Briefly, these and other objects are achieved in accordance with our invention by a circuit utilizing two PNP-type transistors. The collectors of the two transistors are respectively connected to first and second input circuits, and the emitters of the two transistors are connected to a common output circuit. The transistors are connected so that the first transistor is normally turned off, and so that the second transistor is normally turned on. This normal condition connects the second input circuit to the output circuit, and disconnects the first input circuit from the output circuit. When switching is desired, a switching signal is applied to the emitter of the first transistor and to the base of the second transistor to turn the first transistor on and to turn the second transistor off. Under this condition, the first input circuit is connected to the output circuit, and the second input circuit is disconnected from the output circuit. The normal condition can be restored by removing the switching signal.

BRIEF DESCRIPTION OF THE DRAWING

The subject matter which we regard as our invention is particularly pointed out and distinctly claimed in the claims. The structure and operation of our invention, together with further objects and advantages, may be better understood from the following description given in connection with the accompanying drawing, in which:

DESCRIPTION OF THE PREFERRED EMBODIMENT

Figure 1:
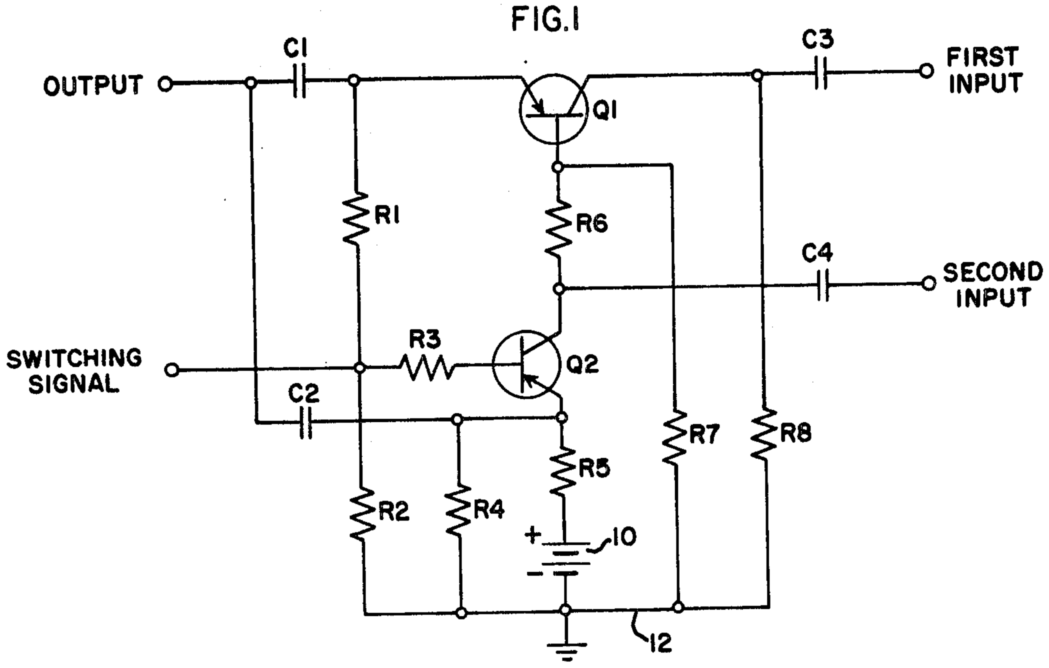
FIG. 1 shows a schematic diagram of a preferred embodiment of a switching circuit in accordance with our invention.

In FIG. 1, we have shown a preferred embodiment of our switching circuit. This switching circuit is intended to selectively connect either a first input circuit or a second input circuit to an output circuit, and may be used in various applications such as the remote radio transmitter mentioned previously. Our circuit comprises first and second PNP-type transistors Q1, Q2. The collector of the transistor Q1 is connected to the first input circuit through a coupling capacitor C3, and the collector of the second transistor Q2 is connected to the second input circuit through a coupling capacitor C4. The emitters of the two transistors Q1, Q2 are connected to a common output circuit through respective coupling capacitors C1, C2. The second transistor Q2 is maintained in a normally conducting or turned-on condition by a source of direct current potential 10 and an appropriate impedance circuit. Specifically, the positive terminal of the source 10 is connected to the emitter of the transistor Q2 by a resistor R5. The collector of the transistor Q2 is connected through two serially connected resistors R6, R7 to the negative terminal of the source 10. The negative terminal of the source 10 may be connected to a point of reference potential, such as a ground bus 12. A resistor R4 is connected between the emitter of the transistor Q2 and the bus 12. Two resistors R2, R3 are serially connected between the base of the transistor Q2 and the bus 12. The resistors and the source 10 are arranged so that in the absence of a switching signal, the transistor Q2 is conducting or turned on. This provides a low impedance path through the collector-emitter path of the transistor Q2 to connect the second input circuit to the output circuit. However, this connection is made through the capacitors C4, C2 so that no direct current is present in the second input circuit or in the output circuit.

With respect to the transistor Q1, a resistor R1 is connected between the emitter of the transistor Q1 and the junction of the resistors R2, R3. The base of the transistor Q1 is connected to the junction of the resistors R6, R7, and the collector of the transistor Q1 is connected through a resistor R8 to the bus 12. With the transistor Q2 conducting or turned on, a voltage is applied to the base of the transistor Q1 that is positive with respect to the voltage at the emitter of the transistor Q1. Hence, the transistor Q1 is held nonconducting or turned off. Thus, the first input circuit is disconnected from the output circuit under this normal condition.

Figure 2:
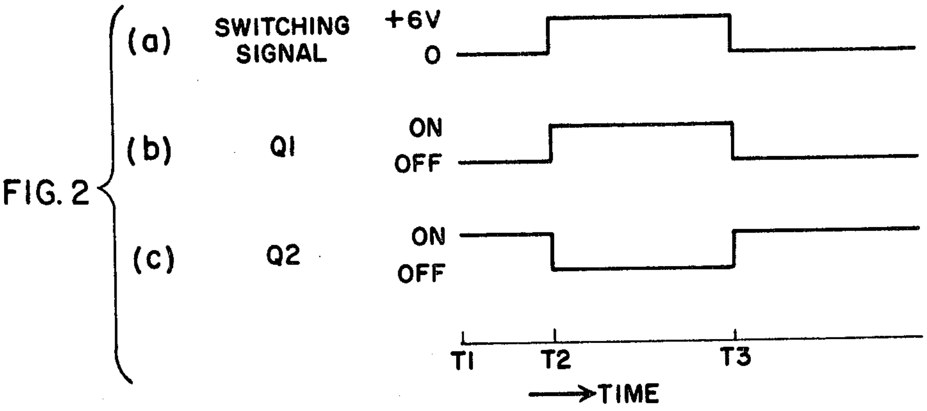
FIGS. 2(*a*), (*b*), and (*c*) show wave forms illustrating the operation of the circuit of FIG. 1.

The operation of the circuit of FIG. 1 will be explained in connection with the wave forms shown in FIGS. 2(*a*), (*b*), and (*c*). These wave forms are plotted along a common time axis. At the time T1, it is assumed that no switching signal is applied, as shown in FIG. 2(*a*). Hence, the transistor Q1 is turned off as shown in FIG. 2(*b*), and the transistor Q2 is turned on as shown in FIG. 2(*c*). Under these conditions, the second input circuit is connected to the output circuit, and the first input circuit is disconnected from the output circuit. A switching signal, assumed to be a positive voltage of 6 volts, is applied at the time T2. This positive voltage is applied to the base of the transistor Q2 and turns the transistor Q2 off. At the same time that the transistor Q2 is turned off, the base voltage of the transistor Q1 approaches zero. The positive switching voltage is also applied to the emitter of the transistor Q1 so that this transistor Q1 is turned on. This condition is shown by the three wave forms at the time T2. With the transistor Q1 turned on, a low impedance path is provided to connect the first input circuit to the output circuit. With the transistor Q2 turned off, a high impedance path is provided to disconnect the second input circuit from the output circuit. This condition will be maintained as long as the positive switching signal is applied. If, at some later time T3, the switching signal is removed, the circuit returns to its normal condition with the transistor Q1 turned off and the transistor Q2 turned on. Under these conditions, the first input circuit is disconnected from the output circuit, and the second input circuit is connected to the output circuit.

It will thus be seen that our invention provides an improved switching circuit that is relatively simple but reliable in operation. A switching circuit connected as shown in FIG. 1 was constructed and operated with the components having the following values:

| Component | Value |
| --- | --- |
| Transistor Q1 | Type 2N3702 |
| Transistor Q2 | Type 2N3702 |
| Capacitor C1 | 0.1$\mu$f. |
| Capacitor C2 | 0.1$\mu$f. |
| Capacitor C3 | 0.1$\mu$f. |
| Capacitor C4 | 0.1$\mu$f. |
| Resistor R1 | 100,000 ohms |
| Resistor R2 | 1,500 ohms |
| Resistor R3 | 47,000 ohms |
| Resistor R4 | 100,000 ohms |
| Resistor R5 | 100,000 ohms |
| Resistor R6 | 220,000 ohms |
| Resistor R7 | 47,000 ohms |
| Resistor R8 | 680,000 ohms |

The source 10 had a voltage of 10 volts, and the switching signal was varied between 0 and +6 volts. This circuit operated satisfactorily, and provided good coupling for audible signals and isolated the direct current from the input and output circuits. The relatively low direct current voltages permit the circuit to be used in or with telephone lines and circuits, if desired.

While the circuit of FIG. 1 represents a preferred embodiment of our invention, persons skilled in the art will appreciate that modifications may be made. For example, our circuit was constructed using NPN-type transistors for the transistor Q1, Q2. With NPN-type transistors, appropriate voltages and switching signals were provided. In addition, various values may be used for the components. Also, a source may be connected at the output and two loads connected at the first and second inputs to selectively connect a single source to one of two loads. And while only one side or lead of the input circuits and the output circuit have been shown, the other sides or leads may be common or may be connected to a similar switching circuit, depending upon whether a balanced or unbalanced circuit is desired. Therefore, while the invention has been described with reference to a particular embodiment, it is to be understood that modifications may be made without departing from the spirit of the invention or from the scope of the claims.

What we claim as new and desire to secure by Letters Patent of the United States is:

1. An improved circuit for selectively switching one of first and second input circuits to an output circuit comprising:

a. first and second PNP-type transistors each having an emitter, a base, and a collector;

b. a first direct-current impedance circuit having a first resistor connected between said emitter of said first transistor and a point of reference potential and a second resistor connected between said collector of said first transistor and said point of reference potential;

c. a second direct-current impedance circuit having a source of direct current potential with its positive terminal connected to said emitter of said second transistor and its negative terminal connected to said point of reference potential, and a third resistor connected between said point of reference potential and said collector of said second transistor to render said second transistor normally conductive;

d. means connecting said base of said first transistor to a point on said third resistor;

e. means connecting said base of said second transistor to a point on said first resistor;

f. means connecting said first input circuit to said collector of said first transistor;

g. means connecting said second input circuit to said collector of said second transistor;

h. means connecting said output circuit to said emitters of both said first and second transistors;

i. and means for selectively applying a positive-going voltage through a point on said first resistor to said emitter of said first transistor and to said base of said second transistor for rendering said first transistor conductive and said second transistor nonconductive.

2. The improved circuit of claim 1 wherein each of said means connecting said first and second input circuits and said output circuits to said transistors comprise a respective capacitor.